US006734836B2

United States Patent
Nishitoba

(10) Patent No.: US 6,734,836 B2
(45) Date of Patent: May 11, 2004

(54) CURRENT DRIVING CIRCUIT

(75) Inventor: Shigeo Nishitoba, Tokyo (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 09/975,007

(22) Filed: Oct. 12, 2001

(65) Prior Publication Data

US 2002/0043991 A1 Apr. 18, 2002

(30) Foreign Application Priority Data

Oct. 13, 2000 (JP) ........................................ 2000-313581

(51) Int. Cl.[7] .................................................. G06G 3/22
(52) U.S. Cl. ............................ 345/82; 345/45; 345/46; 345/80
(58) Field of Search .............................. 345/76, 36, 45, 345/46, 82, 83; 315/169.3, 209 R

(56) References Cited

U.S. PATENT DOCUMENTS

| | | | | |
|---|---|---|---|---|
| 5,235,253 A | * | 8/1993 | Sato | 315/169.3 |
| 5,677,599 A | * | 10/1997 | Wood | 315/169.3 |
| 5,793,163 A | * | 8/1998 | Okuda | 315/169.2 |
| 5,856,918 A | * | 1/1999 | Soneda et al. | 363/60 |
| 6,229,506 B1 | * | 5/2001 | Dawson et al. | 345/82 |
| 6,304,039 B1 | * | 10/2001 | Appelberg et al. | 315/169.3 |
| 6,373,454 B1 | * | 4/2002 | Knapp et al. | 345/76 |
| 6,534,925 B2 | * | 3/2003 | Kawashima | 315/169.1 |

FOREIGN PATENT DOCUMENTS

| | | | | |
|---|---|---|---|---|
| EP | 001191512 A2 | * | 9/2001 | G09G/3/32 |
| GB | 2381643 A | * | 10/2001 | G09G/3/32 |
| JP | 11-24606 | | 1/1999 | |
| JP | 2953465 | | 7/1999 | |
| JP | 11-282419 | | 10/1999 | |

OTHER PUBLICATIONS

Kimura et al., "Low–Temperature Poly–Si TFT Display using Light–Emitting–Polymer", AM–LCD 2000, AM3–1, pp. 245–248.

He et al., "Current–Writing Active–Matrix Driving Circuit for Organic Light Emitting Diode Display", Electronics Society Conference of Electronics Information Communication Institute, 2000, vol. E83–C, No. 5, p. 50.

* cited by examiner

Primary Examiner—Steven Saras
Assistant Examiner—Fritz Alphonse
(74) Attorney, Agent, or Firm—McGinn & Gibb, PLLC

(57) ABSTRACT

A current driving circuit includes a first terminal electrically connected to a voltage source, a second terminal grounded, a signal line through which a signal current runs, a first switch, a second switch electrically connected to the signal line and further electrically connected in series to the first switch, a third switch electrically connected to the first terminal, a memory stage converting the signal current into a voltage and stores the voltage therein, a driving transistor, a load electrically connected between a source of the driving transistor and the second terminal, and a selection line electrically connected to the first to third switches. The signal line is electrically connected to a gate of the driving transistor through the first and second switches. The memory stage is electrically connected between a gate of the driving transistor and the second terminal. The first switch is electrically connected between a drain and a gate of the driving transistor. The driving transistor has a drain electrically connected to the signal line through the second switch and further to the first terminal through the third switch.

34 Claims, 8 Drawing Sheets

CURRENT DRIVING CIRCUIT

BACKGROUND OF THE INVENTION

1. Field of the Invention

The invention relates to a current driving circuit which drives a current running through a load such as an organic electroluminescence device.

2. Description of the Related Art

Among loads which are required to drive a current running therethrough, a typical one is an organic electroluminescence device.

Though an organic electroluminescence device has to be developed in respect of enhancement in a brightness, a longer lifetime, a sealing structure of a module including an organic electroluminescence device and other parts, and so on, an organic electroluminescence device has many advantages: (a) it can be driven with a dc current at a low voltage; (b) it can accomplish a high brightness with a high efficiency; (c) it has a quicker response than a liquid crystal display device; (d) it has superior temperature characteristic at low temperatures; (e) it presents superior visibility; and (f) it emits a light from itself, and hence, it does not need to have a backlight device unlike a liquid crystal display device, and makes it possible to fabricate an image display device thinner than conventional ones when an image display device is designed to include an organic electroluminescence device. Because of the above-mentioned advantages, there is an eager need to be able to accomplish mass-production of an organic electroluminescence device.

As a circuit for driving an organic electroluminescence device applied to an image display device, an active matrix type driving circuit has been studied long, because it can present a high light-emitting efficiency and high image quality. The active matrix type driving circuit includes an amorphous or polysilicon thin film transistor (hereinafter, referred to simply as "TFT") as an active device.

Japanese Unexamined Patent Publication No. 11-282419, for instance, has suggested an active matrix type current driving circuit including TFT for driving an organic electroluminescence device.

FIG. 1 is a circuit diagram of the suggested active matrix type current driving circuit.

The active matrix type current driving circuit is comprised of a first terminal 1 electrically connected to a voltage source, a second terminal 2 grounded, a signal line 3 through which a signal current runs, a selection line 4, an organic electroluminescence device 31 as a load through which a current required to be driven runs, a driving transistor 32, a transistor 33, a storage capacity 34, a first switch 35, and a second switch 36.

The organic electroluminescence device 31 is electrically connected at one end to the first terminal 1, and at the other end to the second terminal 2 through the driving transistor 32.

The driving transistor 32 controls a drive current in accordance with a voltage applied to a gate electrode thereof, and supplies the thus controlled drive current to the organic electroluminescence device 31.

The storage capacity 34 for keeping a constant voltage is electrically connected between a gate of the driving transistor 32 and the second terminal 2.

The second switch 36 is electrically connected at one of terminals to both the storage capacity 34 and the driving transistor 32, and at the other terminal to the transistor 33 which converts a current into a voltage.

The transistor 33 is designed to have the same polarity as that of the driving transistor 32. The transistor 33 has a drain and a gate both of which are electrically connected to each other, and hence, has a diode structure.

In addition, the transistor 33 and the driving transistor 32 cooperate with each other to define a current-mirror circuit through the second switch 36.

The transistor 33 is electrically connected to the signal line 3 through the first switch 35.

Each of the first and second switches 35 and 36 has a control terminal electrically connected to the selection line 4.

When a control signal is input into the selection line 4 to thereby turn both the first and second switches 35 and 36 on, a signal current running through the signal line 3 is input into the transistor 33 through the first switch 35, and is converted into a voltage in the transistor 33. The signal current further charges the storage capacity 34 through the second switch 36. Thus, a voltage associated with the signal current is stored in the storage capacity 34.

Since the transistor 33 and the driving transistor 32 define a current-mirror circuit through the second switch 36, a signal current running through the signal line 3 is supplied to the organic electroluminescence device 31 through the current-mirror circuit.

Even if a control signal is stopped to be input into the selection line 4, and accordingly, the first and second switches 35 and 36 are turned off, the voltage associated with a signal current running through the signal line 3 is stored in the storage capacity 34. Accordingly, the voltage stored in the storage capacity 34 is kept applied to a gate of the driving transistor 32. This ensures that a current which is the same as the signal current running through the signal line 3 is kept supplied to the organic electroluminescence device 31.

The conventional current driving circuit illustrated in FIG. 1 is accompanied with the following problems.

The first problem is that a signal current running is supplied to the organic electroluminescence device 31 from the signal line 3 with low accuracy.

The reason is as follows. A thin film transistor composed of an amorphous or polysilicon sometimes has variance in an order of hundred-millivolts with respect to a threshold voltage because of existence of grain boundary, unlike a semiconductor device composed of mono-crystal. As a result, in the current driving circuit illustrated in FIG. 1 including the transistor 33 and the driving transistor 32 both comprised of TFT, even if the transistors 33 and 32 are arranged adjacent to each other, it would be quite difficult or almost impossible to eliminate the above-mentioned variance in threshold voltages of the transistors 33 and 32, and match the transistors 33 and 32 with each other.

As a result, if the conventional current driving circuit illustrated in FIG. 1 were comprised of TFT, a resultant circuit could be fabricated only in a low fabrication yield and further in remarkably high fabrication costs.

In order to eliminate the above-mentioned variance in a threshold voltage of TFT, there has been suggested a method of processing signals not in an analog form, but in a digital form, for instance, in "a patent has been issued to a circuit for enhancing accuracy in an organic electroluminescence panel", Nikkei Electronics, Apr. 24, 2000, No. 768.

However, the suggested circuit is unavoidably complex in a structure and large in a scale, resulting in an increase in fabrication costs.

The second problem is that the conventional current driving circuit illustrated in FIG. 1 consumes much electric power.

The reason is that though the signal current having run through the signal line 3 is supplied to the transistor 33 defining a current-mirror circuit together with the driving transistor 32, the current having run through the transistor 33 does not run directly through the organic electroluminescence device 31.

Japanese Patent No. 2953465 has suggested a current driving circuit including an input terminal, a first transistor having a drain electrically connected to the input terminal and a source grounded, a switching transistor electrically connected between a gate and a drain of the first transistor, a control terminal electrically connected to a gate of the switching transistor and receiving a signal in accordance with which the switching transistor is turned on or off, a second transistor having a gate electrically connected to the switching transistor and a source grounded, and defining a current-mirror circuit together with the first transistor, and a capacity device electrically connected at one of electrodes thereof to a gate of the second transistor, and grounded at the other electrode.

Japanese Unexamined Patent Publication No. 11-24606 has suggested a display device including a substrate, a plurality of scanning lines formed on the substrate, a plurality of data lines extending in a direction perpendicular to a direction in which the scanning lines extend, a plurality of common power-feeding lines extending in parallel with the data lines, a plurality of pixels defined by the data lines and the scanning lines in a matrix. Each of the pixels includes a first thin film transistor having a first gate electrode to which a scanning signal is transmitted through the scanning lines, a storage capacity storing therein image signals supplied from the data lines through the first thin film transistor, a second thin film transistor having a second gate electrode to which the image signals stored in the storage capacity are transmitted, and an organic semiconductor film which emits a light by a driving current running through a pixel electrode and an opposing electrode when the pixel electrode becomes electrically connected to the common power-feeding lines through the second thin film transistor. At opposite sides of each of the common power-feeding lines are arranged pixels through which the driving current runs from or to the common power-feeding line. The data lines extend at an opposite side of the common power-feeding line about the pixels.

Another active matrix type driving circuit has been suggested by K. Miyake et al., "Current-Writing Active-Matrix Driving Circuit for Organic Light Emitting Diode Display", Electronics Society Conference of Electronics Information Communication Institute, 2000, C-9-5, pp. 50. The suggested driving circuit is designed to include an amorphous silicon thin film transistor and have a function of canceling variance and/or shift in a threshold voltage in an organic light-emitting diode or a thin film transistor.

There is also suggested a polysilicon TFT display by M. Kimura et al. in "Low-Temperature Poly-Si TFT Display using Light-Emitting-Polymer", AM-LCD 2000, AM3-1, pp. 245–248. The suggested low-temperature polysilicon thin film transistor (LT p-Si TFT) light-emitting-polymer displays (LEPDs) have the potential to be thin, compact, light weight, low cost, large and robust, as well as high resolution, low power consumption, a wide viewing angle, and a fast response. The advantages are achieved by combining the properties of both LT p-Si TFTs and LEPDs. Since a relatively large area in a pixel is available for TFTs, there is flexibility to choose a driving method.

However, the above-mentioned problems remain unsolved even in the above-mentioned disclosures.

SUMMARY OF THE INVENTION

In view of the above-mentioned problems in the conventional current driving circuits, it is an object of the present invention to provide a current driving circuit which can be fabricated in lower costs and consumes less electric power than conventional ones.

There is provided a current driving circuit including (a) a first terminal electrically connected to a voltage source, (b) a second terminal grounded, (c) a signal line through which a signal current runs, (d) a first switch, (e) a second switch electrically connected to the signal line and further electrically connected in series to the first switch, (f) a third switch electrically connected to the first terminal, (g) a memory stage which converts the signal current into a voltage and stores the voltage therein, (h) a driving transistor, (i) a load electrically connected between a source of the driving transistor and the second terminal, and (j) a selection line electrically connected to the first switch, the second switch and the third switch, wherein the signal line is electrically connected to a gate of the driving transistor through the first and second switches, the memory stage is electrically connected between a gate of the driving transistor and the second terminal, the first switch is electrically connected between a drain and a gate of the driving transistor, and the driving transistor has a drain which is electrically connected to the signal line through the second switch and further to the first terminal through the third switch.

It is preferable the first and second switches are turned on and the third switch is turned off when the selection line is in one of high and low levels, and the first and second switches are turned off and the third switch is turned on when the selection line is in the other level.

For instance, the load is comprised of an organic electroluminescence device.

There is further provided a current driving circuit including (a) a first terminal electrically connected to a voltage source, (b) a second terminal grounded, (c) a signal line through which a signal current runs, (d) a first switch transistor, (e) a second switch transistor, (f) a third switch transistor, (g) a storage capacity which converts the signal current into a voltage and stores the voltage therein, (h) a driving transistor, (i) a load electrically connected between a source of the driving transistor and the second terminal, and (j) a selection line electrically connected to gates of the first to third switch transistors, wherein the storage capacity is electrically connected between a gate of the driving transistor and the second terminal, the first and second switch transistors are electrically connected in series to each other between the signal line and the driving transistor, a connection point through which the first and second switch transistors are electrically connected to each other is electrically connected to a drain of the driving transistor, and the driving transistor has a drain electrically connected to the first terminal through the third switch transistor.

For instance, the first and second switch transistors may have the same polarity as a polarity of the driving transistor. As an alternative, the first and second switch transistors may have a polarity opposite to a polarity of the driving transistor.

For instance, the third switch transistor may have a polarity opposite to a polarity of the driving transistor, the first switch transistor and the second switch transistor. As an alternative, the third switch transistor may have a polarity which is identical with a polarity of the driving transistor, and is opposite to a polarity of the first and second switch transistors.

There is still further provided a current driving circuit including (a) a first terminal electrically connected to a voltage source, (b) a second terminal grounded, (c) a signal line through which a signal current runs, (d) a first switch transistor, (e) a second switch transistor, (f) a third switch transistor, (g) a storage capacity which converts the signal current into a voltage and stores the voltage therein, (h) a driving transistor, (i) a load electrically connected between a source of the driving transistor and the second terminal, and (j) a selection line electrically connected to gates of the first to third switch transistors, wherein the storage capacity is electrically connected between a gate of the driving transistor and the second terminal, the second switch transistor has a source electrically connected to a connection point through which a drain of the driving transistor and a drain of the third switch transistor are electrically connected to each other, the first and second switch transistors have drains electrically connected to the signal line, the first switch transistor has a source electrically connected to a connection point through which a gate of the driving transistor and the storage capacity are electrically connected to each other, and the driving transistor has a drain electrically connected to the first terminal through the third switch transistor.

There is yet further provided a current driving circuit including (a) a first terminal electrically connected to a voltage source, (b) a second terminal grounded, (c) a signal line through which a signal current runs, (d) a first switch transistor, (e) a second switch transistor, (f) a third switch transistor, (g) a fourth transistor, (h) a storage capacity which converts the signal current into a voltage and stores the voltage therein, (i) a driving transistor, (j) a load electrically connected between a source of the driving transistor and the second terminal, and (k) a selection line electrically connected to gates of the first to third switch transistors, wherein the storage capacity is electrically connected between a gate of the driving transistor and the second terminal, the second switch transistor has a source electrically connected to a connection point through which a drain of the driving transistor and a drain of the third switch transistor are electrically connected to each other, the second switch transistor has a drain electrically connected to the signal line, the fourth transistor is electrically connected between a drain of the first switch transistor and a drain of the second switch transistor, the fourth transistor has the same polarity as a polarity of the first and second switch transistors, the fourth transistor has a drain and a gate both of which are electrically connected to a connection point through which the second switch transistor and the signal line are electrically connected to each other, and a source electrically connected to a drain of the first switch transistor, the first switch transistor has a source electrically connected to a connection point through which a gate of the driving transistor and the storage capacity are electrically connected to each other, and the driving transistor has a drain electrically connected to the first terminal through the third switch transistor.

There is still yet further provided a current driving circuit including (a) a first terminal electrically connected to a voltage source, (b) a second terminal grounded, (c) a signal line through which a signal current runs, (d) a first switch transistor, (e) a second switch transistor, (f) a third switch transistor, (g) a fourth transistor, (h) a storage capacity which converts the signal current into a voltage and stores the voltage therein, (i) a driving transistor, (j) a load electrically connected between a source of the driving transistor and the second terminal, and (k) a selection line electrically connected to gates of the first to third switch transistors, wherein the storage capacity is electrically connected between a gate of the driving transistor and the second terminal, the second switch transistor has a source electrically connected to a connection point through which a drain of the driving transistor and a drain of the third switch transistor are electrically connected to each other, the first and second switch transistors have drains electrically connected to the signal line, the fourth transistor has a source electrically connected to a connection point through which the storage capacity and a gate of the driving transistor are electrically connected to each other, and a drain electrically connected to the signal line, the first switch transistor has a source electrically connected to a gate of the fourth transistor, and the driving transistor has a drain electrically connected to the first terminal through the third switch transistor.

There is further provided a current driving circuit including (a) a first terminal electrically connected to a voltage source, (b) a second terminal grounded, (c) a signal line through which a signal current runs, (d) a first switch transistor, (e) a second switch transistor, (f) a third switch transistor, (g) a fourth transistor, (h) a first storage capacity which converts the signal current into a voltage and stores the voltage therein, (i) a first storage capacity which converts the signal current into a voltage and stores the voltage therein, (j) a driving transistor, (k) a load electrically connected between a source of the driving transistor and the second terminal, and (l) a selection line electrically connected to gates of the first to third switch transistors, wherein the first storage capacity is electrically connected between a gate of the driving transistor and the second terminal, the first switch transistor is electrically connected between a drain and a gate of the driving transistor, the fourth transistor has a drain electrically connected to the signal line and a source electrically connected to a drain of the driving transistor, the second switch transistor is electrically connected between a drain and a gate of the fourth transistor, the second storage capacity is electrically connected between a gate of the fourth transistor and a gate of the driving transistor, and the driving transistor has a drain electrically connected to the first terminal through both the third switch transistor and the fourth transistor.

There is further provided an image display device including such a current driving circuit as mentioned above.

The advantages obtained by the aforementioned present invention will be described hereinbelow.

The current driving circuit in accordance with the present invention is designed to include the storage capacity between a gate of the driving transistor and the second terminal. This ensures that a signal current supplied from the signal line is stored in the storage capacity, and further is converted into a signal voltage in the storage capacity, when the selection line is in a high level, and that even if the selection line is turned at a low level and hence the signal current is not supplied to the storage capacity, the driving transistor is driven by the signal voltage stored in the storage capacity, and accordingly, a current is supplied to the load such as an organic electroluminescence device.

Thus, the current driving circuit in accordance with the present invention is unlikely to be influenced by variance which would be generated in a process of fabricating a semiconductor device, and is able to enhance a fabrication yield of fabrication a semiconductor device.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 1:
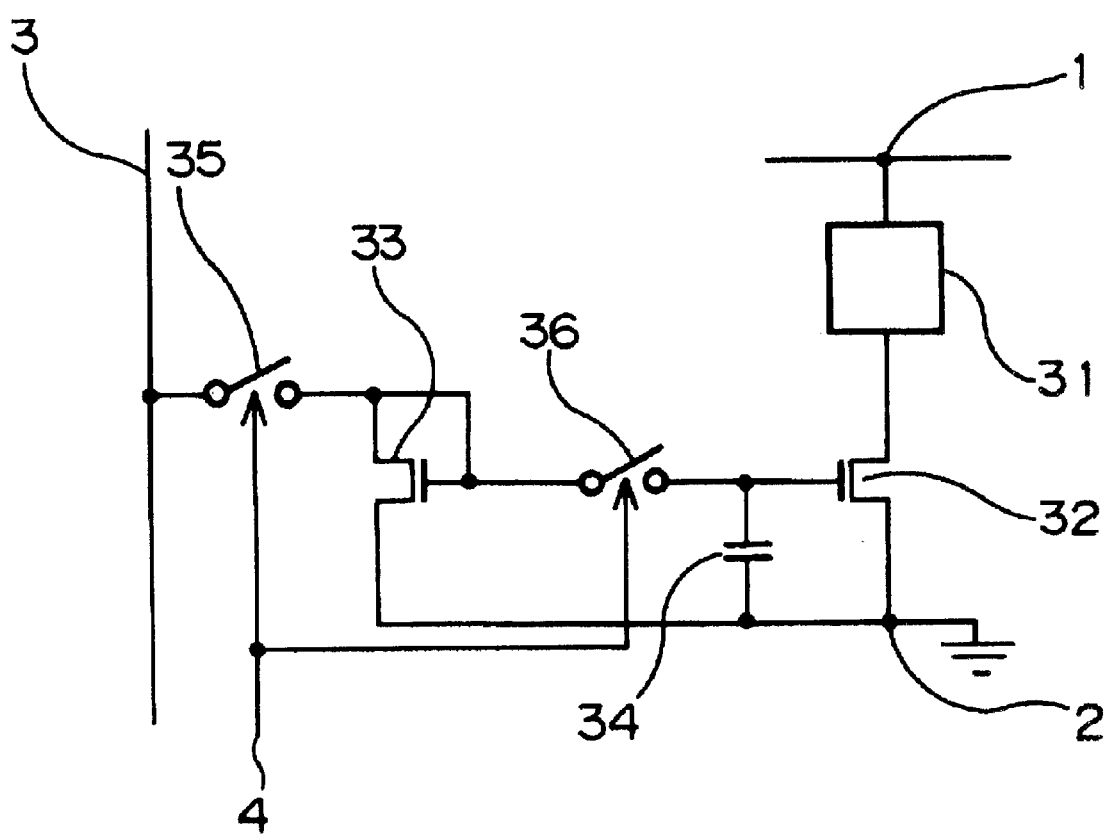
FIG. 1 is a circuit diagram of a conventional current driving circuit.
Figure 2:
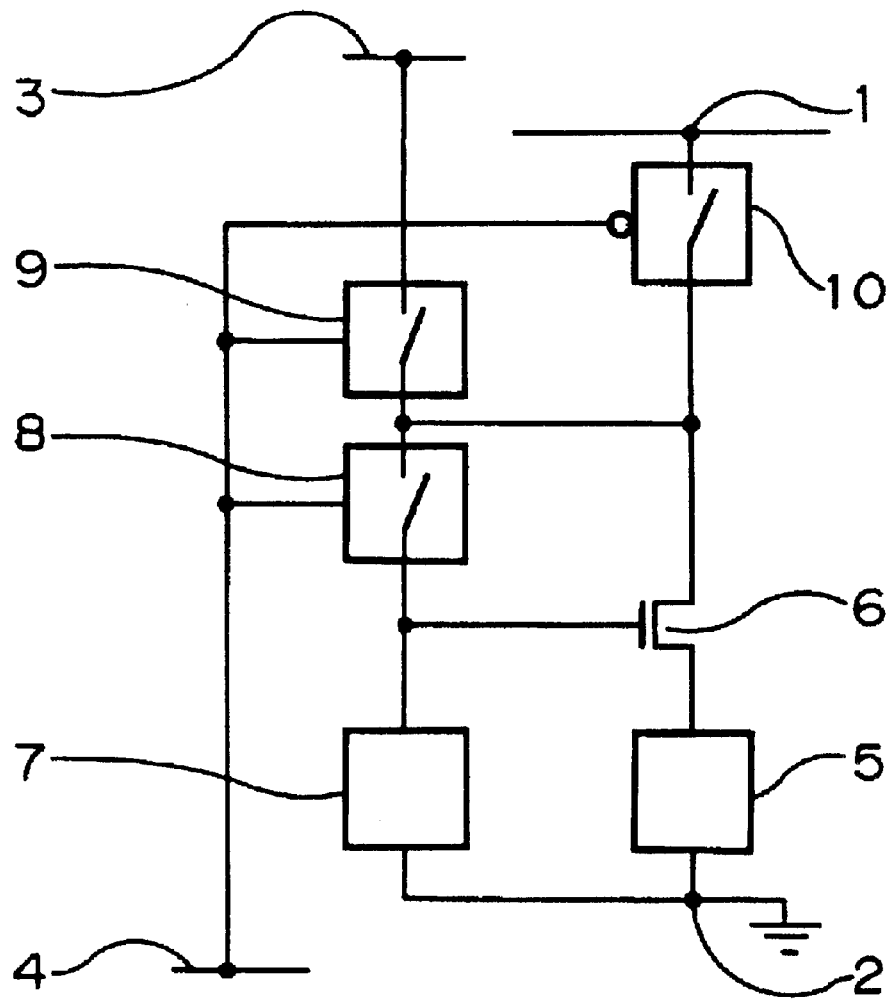
FIG. 2 is a circuit diagram of a current driving circuit in accordance with the first embodiment of the present invention.

FIG. 2 is a circuit diagram of a current driving circuit in accordance with the first embodiment of the present invention.

The current driving circuit is comprised of a first terminal 1 electrically connected to a voltage source, a second terminal 2 grounded, the first and second terminals 1 and 2 constituting a pair of voltage source electrodes, a signal line 3 through which a signal current runs, a first switch 8, a second switch 9 electrically connected in series to the first switch 8, a third switch 10 electrically connected to the first terminal 1, a storage stage 7 which converts the signal current into a voltage, and stores the voltage therein, a driving transistor 6, a load 5 electrically connected between a source of the driving transistor 6 and the second terminal 2, and a selection line 4 electrically connected to the first to third switches 8, 9 and 10.

The signal line 3 is electrically connected to a gate of the driving transistor 6 through the first and second switches 8 and 9 electrically connected in series to each other.

The load 5 electrically connected between a source of the driving transistor 6 and the second terminal 2 receives a signal current from the signal line 3 through the driving transistor 6. The load 5 is necessary to be driven a current running therethrough, and is comprised of an organic electroluminescence device, for instance.

The storage stage 7 which converts the signal current supplied from the signal line 3, into a signal voltage, and stores the signal voltage therein. The storage stage 7 is electrically connected between a gate of the driving transistor 6 and the second terminal 2.

The first switch 8 is electrically connected between a drain and a gate of the driving transistor 6.

The driving transistor 6 has a drain electrically connected to the signal line 3 through the second switch 9, and further electrically connected to the first terminal 1 through the third switch 10.

The first to third switches 8 to 10 have a control terminal electrically connected to the selection line 4.

When the first switch 8 is on, a drain and a gate of the driving transistor 6 are short-circuited with each other.

The third switch 10 is designed to have a polarity just opposite to a polarity of the first and second switches 8 and 9. Specifically, when the selection line 4 is in a high level, the first and second switches 8 and 9 are turned on, and the third switch 10 is turned off. In contrast, when the selection line 4 is in a low level, the first and second switches 8 and 9 are turned off, and the third switch 10 is turned on.

Hereinbelow is explained an operation of the current driving circuit.

In the current driving circuit in accordance with the first embodiment, illustrated in FIG. 2, a signal current runs through the signal line 3. When the selection line 4 is in a high level, the first and second switches 8 and 9 are both turned on, resulting in that a drain and a gate of the driving transistor 6 are short-circuited with each other, and hence, the driving transistor 6 acts as a diode. The third switch 10 is turned off.

Accordingly, the signal current running through the signal line 3 is not only stored into the storage stage 7 through the first and second switches 8 and 9, but also supplied to the load 5 through the driving transistor 6. That is, when the selection line 4 is in a high level, the signal current is supplied to the load 5 from the signal line 3.

On the other hand, when the selection line 4 is in a low level, the first and second switches 8 and 9 are both turned off, and the third switch 10 is turned on.

Consequently, a drain and a gate of the driving transistor 6 are not short-circuited with each other, resulting in that the signal current is not supplied to the load 5 from the signal line 3. However, since the third switch 10 is on, a drain of the driving transistor 6 is electrically connected to the first terminal 1 through the third switch 10, and the signal voltage which is a resultant voltage of converting the signal current supplied from the signal line 3 and stored in the storage stage 7 when the selection line 4 was in a high level is applied to a gate of the driving transistor 6.

Accordingly, even if the selection line 4 is in a low level, and hence, the signal current is not applied to the load 5, the signal voltage having been stored in the storage stage 7 is applied to a gate of the driving transistor 6, and the driving transistor 6 supplies a current corresponding to the signal voltage, to the load 5 through the first terminal 1 and the third switch 10. Thus, even when the selection line 4 is in a low level, the driving transistor 6 can supply a current to the load 5 from the first terminal 1.

The driving transistor 6 keeps supplying a current to the load 5 by virtue of the voltage stored in the storage stage 7, even if the signal current is not supplied thereto from the signal line 3.

When the selection line 4 is in a high level, since the first switch 8 is kept on, a drain and a gate of the driving transistor 6 are short-circuited with each other. That is, a voltage between a drain and a source of the driving transistor 6 is equal to a voltage between a gate and a source of the driving transistor 6.

On the other hand, when the selection line 4 is a low level, since a drain of the driving transistor 6 is electrically connected to the first terminal 1 through the third switch 10, a voltage between a drain and a source of the driving transistor 6 is dependent on a voltage of the first terminal 1, and hence, the selection line 4 is not always in a high level. This phenomenon is called Early effect. This sometimes causes that a drive current supplied to the load from the driving transistor 6 when the selection line 4 is in a high level may be different the same when the selection line 4 is in a low level.

However, since the storage stage 7 is electrically connected between a gate of the driving transistor 6 and the second terminal 2, an increase in the drive current caused by the above-mentioned Early effect or Early voltage can be suppressed because of a feedback function of the load 5 electrically connected between a source of the driving transistor 6 and the second terminal 2.

The current driving circuit in accordance with the first embodiment may be used as a driving circuit for displaying images in an active matrix type organic electroluminescence device including TFT.

The current driving circuit in accordance with the first embodiment presents the following advantages.

The first advantage is that it is no longer necessary to carry out both matching TFTs constituting the current driving circuit, to one another, and adjustment in an accuracy in a threshold voltage. As a result, it would be possible to significantly enhance a fabrication yield, and present an image display device in quite low fabrication costs.

The second advantage is that since a circuit current all flows into the load 5 in the current driving circuit in accordance with the first embodiment, it would be possible to reduce both a circuit current and power consumption. Accordingly, the current driving circuit in accordance with the first embodiment can be suitably applied to a portable device.

The reason is as follows.

The conventional current driving circuit was comprised of a current-mirror circuit. A current-mirror circuit is generally necessary to include a diode-structured transistor for converting a signal current into a voltage. Since a current running through the transistor is not supplied directly to a load, power consumption is unavoidably increased.

In contrast, since the current driving circuit in accordance with the first embodiment is not comprised of a current-mirror circuit, it is no longer necessary for the current driving circuit to include a diode-structured transistor for converting a signal current into a voltage. In addition, since a circuit current all flows into the load 5 in the current driving circuit in accordance with the first embodiment, it would be possible to significantly reduce power consumption in comparison with the conventional current driving circuit.

[Second Embodiment]

Figure 3:
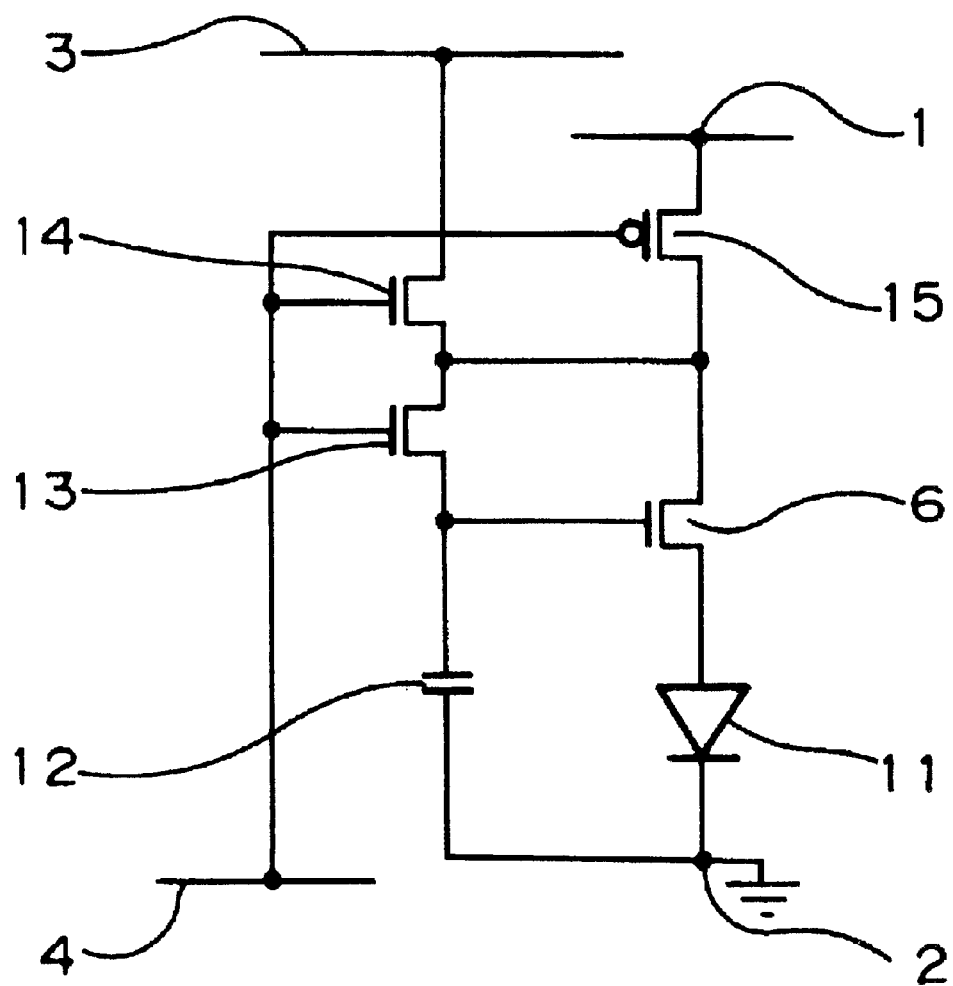
FIG. 3 is a circuit diagram of a current driving circuit in accordance with the second embodiment of the present invention.

FIG. 3 is a circuit diagram of a current driving circuit in accordance with the second embodiment of the present invention.

The current driving circuit is comprised of a first terminal 1 electrically connected to a voltage source, a second terminal 2 grounded, the first and second terminals 1 and 2 constituting a pair of voltage source electrodes, a signal line 3 through which a signal current runs, a first switch transistor 13, a second switch transistor 14, a third switch transistor 15 electrically connected to the first terminal 1, a storage capacity 12 which converts the signal current into a voltage, and stores the voltage therein, a driving transistor 6, an organic electroluminescence device 11 acting as a load to the driving transistor 6, and a selection line 4 electrically connected to gates of the first to third switch transistors 13, 14 and 15.

The organic electroluminescence device 11 as a load to the driving transistor 6 is electrically connected between a source of the driving transistor 6 and the second terminal 2.

The storage capacity 12 is electrically connected between a gate of the driving transistor 6 and the second terminal 2.

The first and second switch transistors 13 and 14 are electrically connected in series to each other between the signal line 3 and a gate of the driving transistor 6. That is, the first switch transistor 13 has a source electrically connected to a gate of the driving transistor 6, and a drain electrically connected to a source of the second switch transistor 14, and the second switch transistor 14 has a drain electrically connected to the signal line 3.

The first and second switch transistors 13 and 14 are designed to have a polarity which is identical to a polarity of the driving transistor 6, but is opposite to a polarity of the third switch transistor 15.

A connection point through which a drain of the first switch transistor 13 is electrically connected to a source of the second switch transistor 14 is electrically connected to a connection point through which a drain of the driving transistor 6 is electrically connected to a drain of the third switch transistor 15.

The driving transistor 6 has a drain electrically connected to the first terminal 1 through the third switch transistor 15.

The first to third switch transistors 13 to 15 have a gate electrically connected to the selection line 4.

Hereinbelow is explained an operation of the current driving circuit.

When a signal current is applied to the signal line 3, and hence, the selection line 4 turns into a high level, the first and second switch transistors 13 and 14 are both turned on, resulting in that a drain and a gate of the driving transistor 6 are short-circuited with each other through the first switch transistor 13, and hence, the driving transistor 6 acts as a diode. The third switch transistor 15 is turned off.

Accordingly, the signal current running through the signal line 3 is supplied to the storage capacity 12 through the first and second switch transistors 13 and 14. Then, the signal current is not only converted into a signal voltage in the storage capacity 12, but also supplied to the organic electroluminescence device 11 from the driving transistor 6.

On the other hand, when the selection line 4 is in a low level, the first and second switch transistors 13 and 14 are both turned off, and the third switch transistor 15 is turned on.

Consequently, a drain and a gate of the driving transistor 6 are open to each other, and in addition, a drain of the driving transistor 6 is electrically connected to the first terminal 1 through the third switch transistor 15.

In addition, the signal voltage obtained by converting the signal current and stored in the storage capacity 12 when the selection line 4 is in a high level is kept applied to a gate of the driving transistor 6. Accordingly, even if the selection line 4 is in a low level, and hence, the signal current is not applied to the storage capacity 12, since the signal voltage having been stored in the storage capacity 12 is applied to a gate of the driving transistor 6, the driving transistor 6 supplies a current corresponding to the signal voltage stored in the storage capacity 12, to the organic electroluminescence device 11 through the first terminal 1.

As is obvious to those skilled in the art in view of the explanation having been made above, the current driving circuit in accordance with the second embodiment can provide the same advantages as those obtained by the first embodiment.

[Third Embodiment]

Figure 4:
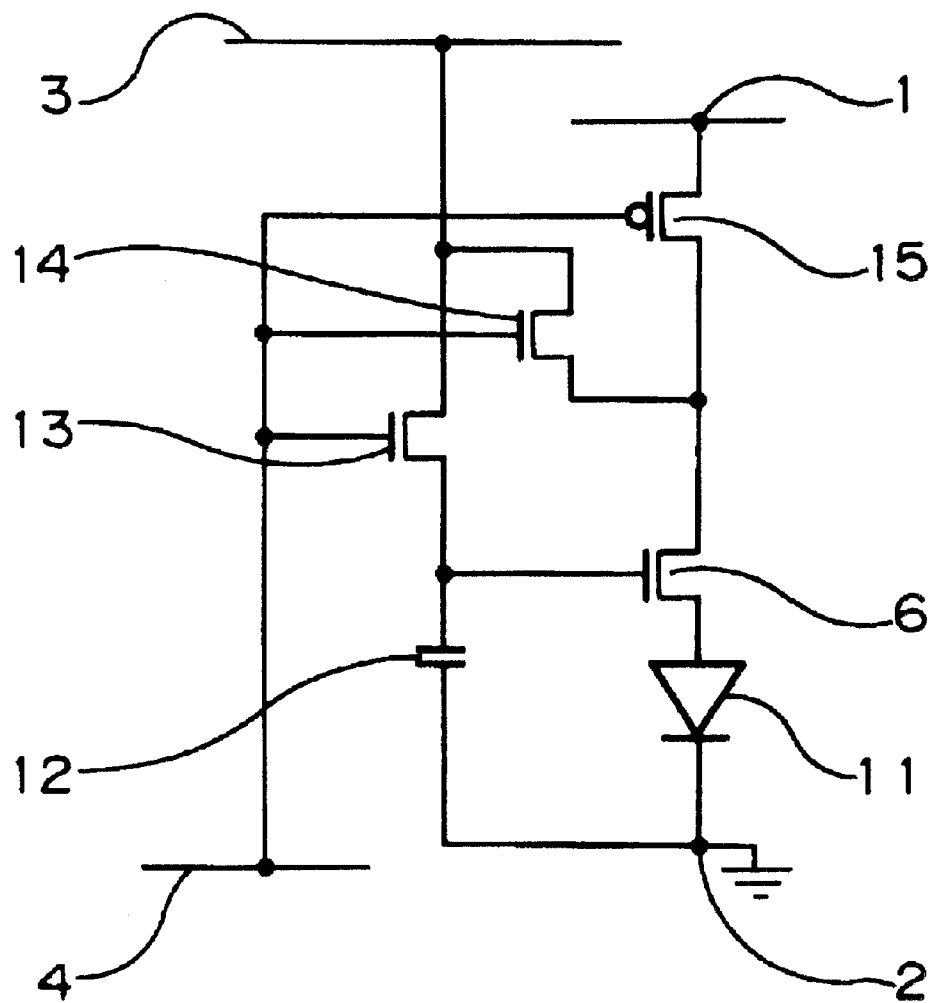
FIG. 4 is a circuit diagram of a current driving circuit in accordance with the third embodiment of the present invention.

FIG. 4 is a circuit diagram of a current driving circuit in accordance with the third embodiment of the present invention.

The current driving circuit is comprised of a first terminal 1 electrically connected to a voltage source, a second terminal 2 grounded, the first and second terminals 1 and 2 constituting a pair of voltage source electrodes, a signal line 3 through which a signal current runs, a first switch transistor 13, a second switch transistor 14, a third switch transistor 15 electrically connected to the first terminal 1, a storage capacity 12 as a storage stage which converts the signal current into a voltage, and stores the voltage therein, a driving transistor 6, an organic electroluminescence device 11 acting as a load to the driving transistor 6, and a selection line 4 electrically connected to gates of the first to third switch transistors 13, 14 and 15.

The current driving circuit in accordance with the third embodiment is structurally different from the current driving circuit in accordance with the second embodiment, illustrated in FIG. 3, with respect to the arrangement of the second switch transistor 14. Specifically, the current driving circuit in accordance with the third embodiment is structurally the same as the second embodiment in that the second switch transistor 14 has a gate electrically connected to the selection line 4, but structurally different from the second embodiment in that the second switch transistor 14 has a source electrically connected to a connection point through which a drain of the driving transistor 6 and a drain of the third switch transistor 15 are electrically connected to each other, and a drain electrically connected to a connection point through which a drain of the first switch transistor 13 and the signal line 3 are electrically connected to each other.

The current driving circuit in accordance with the third embodiment has the same structure as the structure of the current driving circuit in accordance with the second embodiment except the above-mentioned arrangement of the second switch transistor 14.

The current driving circuit in accordance with the third embodiment operates as follows.

When the selection line 4 is in a high level, the first and second switch transistors 13 and 14 are both turned on, and the third switch transistor 15 is turned off.

Accordingly, the signal current running through the signal line 3 is supplied to the storage capacity 12 through the first switch transistor 13, and stored as the signal voltage in the storage capacity 12. Furthermore, the signal current is supplied to the driving transistor 6 through the second switch transistor 14, and then, supplied further to the organic electroluminescence device 11.

On the other hand, when the selection line 4 is in a low level, the first and second switch transistors 13 and 14 are both turned off, and the third switch transistor 15 is turned on.

Consequently, though the signal current is interrupted to be supplied from the signal line 3, the driving transistor 6 is electrically connected to the first terminal 1 through the third switch transistor 15 having been turned on. Accordingly, even if the selection line 4 is in a low level, and hence, the signal current is not applied to the storage capacity 12, the signal voltage having been stored in the storage capacity 12 is applied to a gate of the driving transistor 6. Hence, a current corresponding to the signal voltage stored in the storage capacity 12 is supplied to the driving transistor 6 from the first terminal 1. The current is then supplied to the organic electroluminescence device 11 through the driving transistor 6.

As is obvious to those skilled in the art in view of the explanation having been made above, the current driving circuit in accordance with the third embodiment can provide the same advantages as those obtained by the first embodiment.

[Fourth Embodiment]

Figure 5:
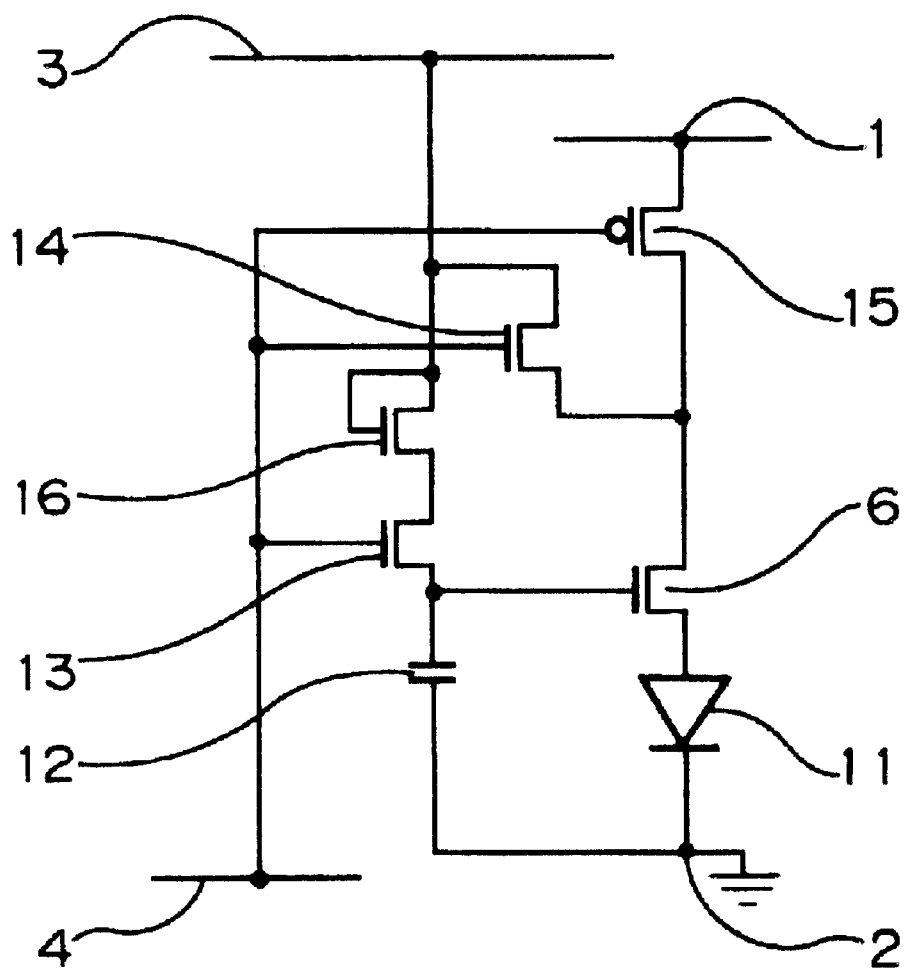
FIG. 5 is a circuit diagram of a current driving circuit in accordance with the fourth embodiment of the present invention.

FIG. 5 is a circuit diagram of a current driving circuit in accordance with the fourth embodiment of the present invention.

The current driving circuit is comprised of a first terminal 1 electrically connected to a voltage source, a second terminal 2 grounded, the first and second terminals 1 and 2 constituting a pair of voltage source electrodes, a signal line 3 through which a signal current runs, a first switch transistor 13, a second switch transistor 14, a third switch transistor 15 electrically connected to the first terminal 1, a level-shifting transistor 16, a storage capacity 12 as a storage stage which converts the signal current into a voltage, and stores the voltage therein, a driving transistor 6, an organic electroluminescence device 11 acting as a load to the driving transistor 6, and a selection line 4 electrically connected to gates of the first to third switch transistors 13, 14 and 15.

The current driving circuit in accordance with the fourth embodiment is structurally different from the current driving circuit in accordance with the third embodiment, illustrated in FIG. 4, only in further including the level-shifting transistor 16.

The level-shifting transistor 16 is electrically connected between a drain of the first switch transistor 13 and a drain of the second switch transistor 14. The level-shifting transistor 16 has a drain and a gate both of which are electrically connected to a connection point through which a source of the second switch transistor 14 and the signal line 3 are electrically connected to each other, and a source electrically connected to a source of the first switch transistor 13.

The level-shifting transistor 16 has the same polarity as a polarity of the first and second switch transistors 13 and 14.

The current driving circuit in accordance with the fourth embodiment operates as follows.

When the selection line 4 is in a high level, the first and second switch transistors 13 and 14 in the first embodiment, illustrated in FIG. 4, operate in a saturation area. In contrast, the first switch transistor 13 in the fourth embodiment operates in a non-saturation area due to the level-shifting transistor 16.

The current driving circuit in accordance with the fourth embodiment operates in the same manner as the current driving circuit in accordance with the first embodiment, illustrated in FIG. 4, except the above-mentioned operation of the first switch transistor 13.

As is obvious to those skilled in the art in view of the explanation having been made above, the current driving circuit in accordance with the fourth embodiment can provide the same advantages as those obtained by the first embodiment.

[Fifth Embodiment]

Figure 6:
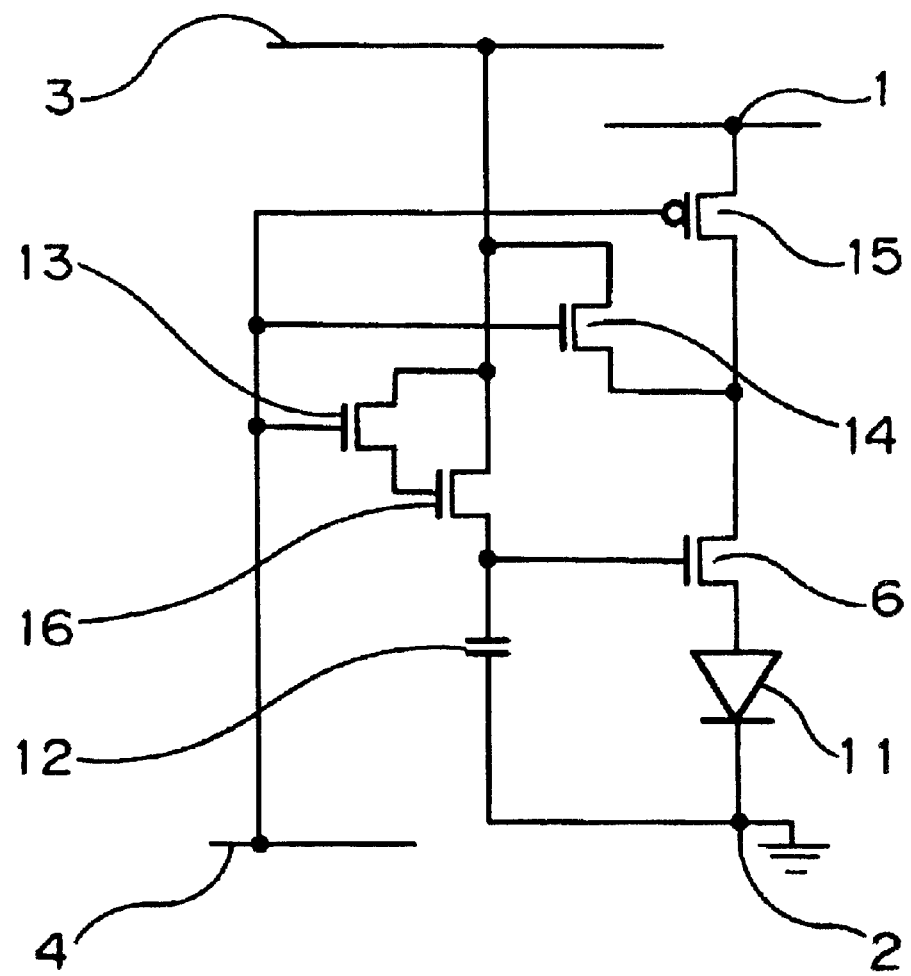
FIG. 6 is a circuit diagram of a current driving circuit in accordance with the fifth embodiment of the present invention.

FIG. 6 is a circuit diagram of a current driving circuit in accordance with the fifth embodiment of the present invention.

The current driving circuit is comprised of a first terminal 1 electrically connected to a voltage source, a second terminal 2 grounded, the first and second terminals 1 and 2 constituting a pair of voltage source electrodes, a signal line 3 through which a signal current runs, a first switch transistor 13, a second switch transistor 14, a third switch transistor 15 electrically connected to the first terminal 1, a level-shifting transistor 16, a storage capacity 12 as a storage stage which converts the signal current into a voltage, and stores the voltage therein, a driving transistor 6, an organic electroluminescence device 11 acting as a load to the driving transistor 6, and a selection line 4 electrically connected to gates of the first to third switch transistors 13, 14 and 15.

The current driving circuit in accordance with the fifth embodiment is structurally different from the current driving circuit in accordance with the fourth embodiment, illustrated in FIG. 5, in the arrangement of the first switch transistor 13 and the level-shifting transistor 16.

The first switch transistor 13 has a gate electrically connected to the selection line 4, a source electrically connected to a gate of the level-shifting transistor 16, and a drain electrically connected to a connection point through which a drain of the second switch transistor 14 and a drain of the level-shifting transistor 16 are electrically connected to each other.

The level-shifting transistor 16 has a source electrically connected to a connection point through which the storage capacity 12 and a gate of the driving transistor 6 are electrically connected to each other, a drain electrically connected to the signal line 3, and a gate electrically connected to a source of the first switch transistor 13.

The current driving circuit in accordance with the fifth embodiment has the same structure as the structure of the current driving circuit in accordance with the fifth embodiment, illustrated in FIG. 5, except the arrangement of the first switch transistor 13 and the level-shifting transistor 16.

The current driving circuit in accordance with the fifth embodiment operates as follows.

When the selection line 4 is in a high level, the first and second switch transistors 13 and 14 are both turned on, and resultingly, a drain and a gate of the level-shifting transistor 16 are electrically connected to each other through the first switch transistor 13. As a result, the level-shifting transistor 16 acts as a diode.

The current driving circuit in accordance with the fifth embodiment operates in the same manner as the current driving circuit in accordance with the first embodiment, illustrated in FIG. 4, except the above-mentioned operation of the level-shifting transistor 16.

As is obvious to those skilled in the art in view of the explanation having been made above, the current driving circuit in accordance with the fifth embodiment can provide the same advantages as those obtained by the first embodiment.

[Sixth Embodiment]

Figure 7:
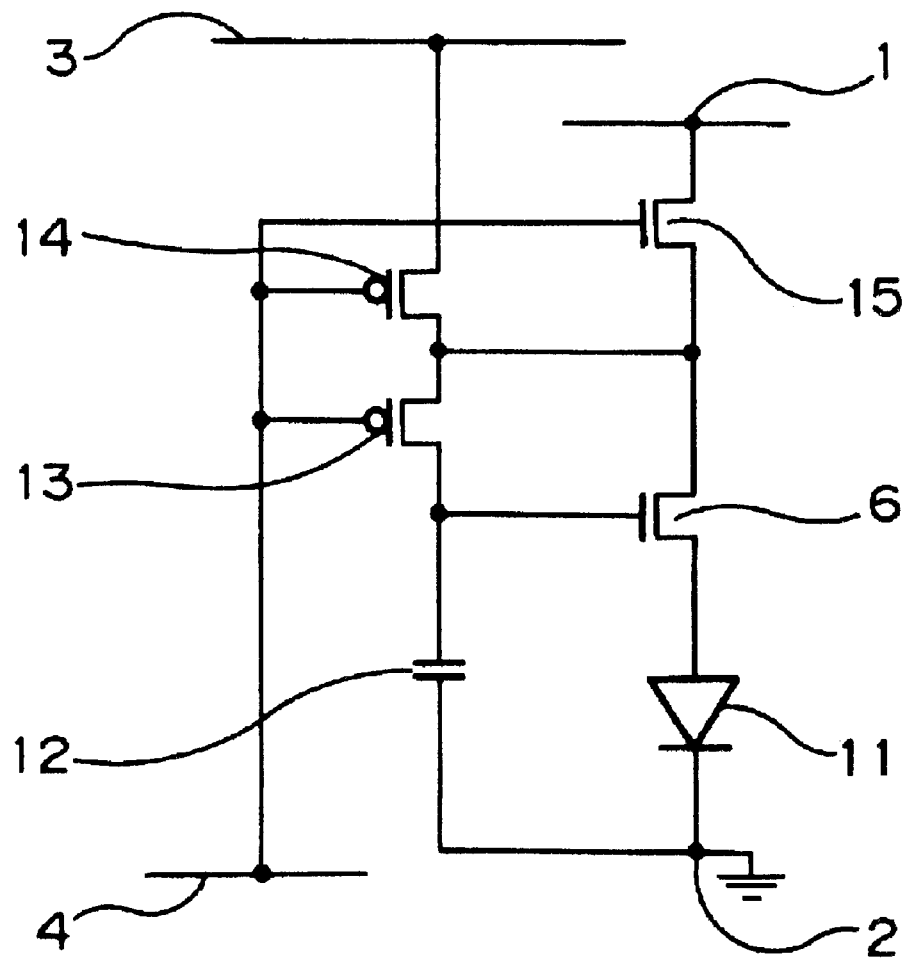
FIG. 7 is a circuit diagram of a current driving circuit in accordance with the sixth embodiment of the present invention.

FIG. 7 is a circuit diagram of a current driving circuit in accordance with the sixth embodiment of the present invention.

The current driving circuit is comprised of a first terminal 1 electrically connected to a voltage source, a second terminal 2 grounded, the first and second terminals 1 and 2 constituting a pair of voltage source electrodes, a signal line 3 through which a signal current runs, a first switch transistor 13, a second switch transistor 14, a third switch transistor 15 electrically connected to the first terminal 1, a storage capacity 12 as a storage stage which converts the signal current into a voltage, and stores the voltage therein, a driving transistor 6, an organic electroluminescence device 11 acting as a load to the driving transistor 6, and a selection line 4 electrically connected to gates of the first to third switch transistors 13, 14 and 15.

In brief, the current driving circuit in accordance with the sixth embodiment has the same structure as the structure of the current driving circuit in accordance with the second embodiment except a polarity between the first to third switch transistors 13 to 15 and the driving transistor 6.

Specifically, whereas the first and second switch transistors 13 and 14 have the same polarity as a polarity of the driving transistor 6, and the third switch transistor 16 has a polarity just opposite to a polarity of the driving transistor 6 in the current driving circuit in accordance with the second embodiment, illustrated in FIG. 3, the first and second switch transistors 13 and 14 have a polarity just opposite to a polarity of the driving transistor 6, and the third switch transistor 16 has the same polarity as a polarity of the driving transistor 6 in the current driving circuit in accordance with the present embodiment.

In the current driving circuits in accordance with the first to fifth embodiments, illustrated in FIGS. 2 to 6, when the selection line 4 is in a high level, the signal current running through the signal line 3 is supplied to the organic luminescence device 11 through the driving transistor 6, whereas when the selection line 4 is in a low level, a current is supplied to the organic luminescence device 11 from the first terminal 1 through the third switch transistor 15 and the driving transistor 6.

In contrast, in the current driving circuit in accordance with the sixth embodiment, illustrated in FIG. 7, a current is supplied to the organic luminescence device 11 in the following way.

When the selection line 4 is in a low level, the first and second switch transistors 13 and 14 are both turned on, and the third switch transistor 15 is turned off.

Accordingly, the signal current running through the signal line 3 is supplied to the storage capacity 12 through the first and second switch transistors 13 and 14. Then, the signal current is not only converted into a signal voltage in the storage capacity 12, but also supplied to the organic electroluminescence device 11 through the driving transistor 6.

On the other hand, when the selection line 4 is in a high level, the first and second switch transistors 13 and 14 are both turned off, and the third switch transistor 15 is turned on.

Consequently, a drain and a gate of the driving transistor 6 are open to each other, and in addition, the third switch transistor 15 is turned on. Hence, a drain of the driving transistor 6 is electrically connected to the first terminal 1 through the third switch transistor 15.

In addition, the signal voltage obtained by converting the signal current and stored in the storage capacity 12 is kept applied to a gate of the driving transistor 6.

Accordingly, even if the selection line 4 is in a high level, and hence, the signal current is not applied to the storage capacity 12, since the signal voltage having been stored in the storage capacity 12 is applied to a gate of the driving transistor 6, the driving transistor 6 supplies a current corresponding to the signal voltage stored in the storage capacity 12, to the organic electroluminescence device 11 from the first terminal 1.

In accordance with the above-mentioned sixth embodiment, it would be possible to eliminate influence caused by the Early voltage, by appropriately selecting a high level voltage of the selection line 4 and appropriately selecting a voltage across a drain and a source of the driving transistor 6, even in a non-saturation area where the driving transistor 6 does not operate.

[Seventh Embodiment]

Figure 8:
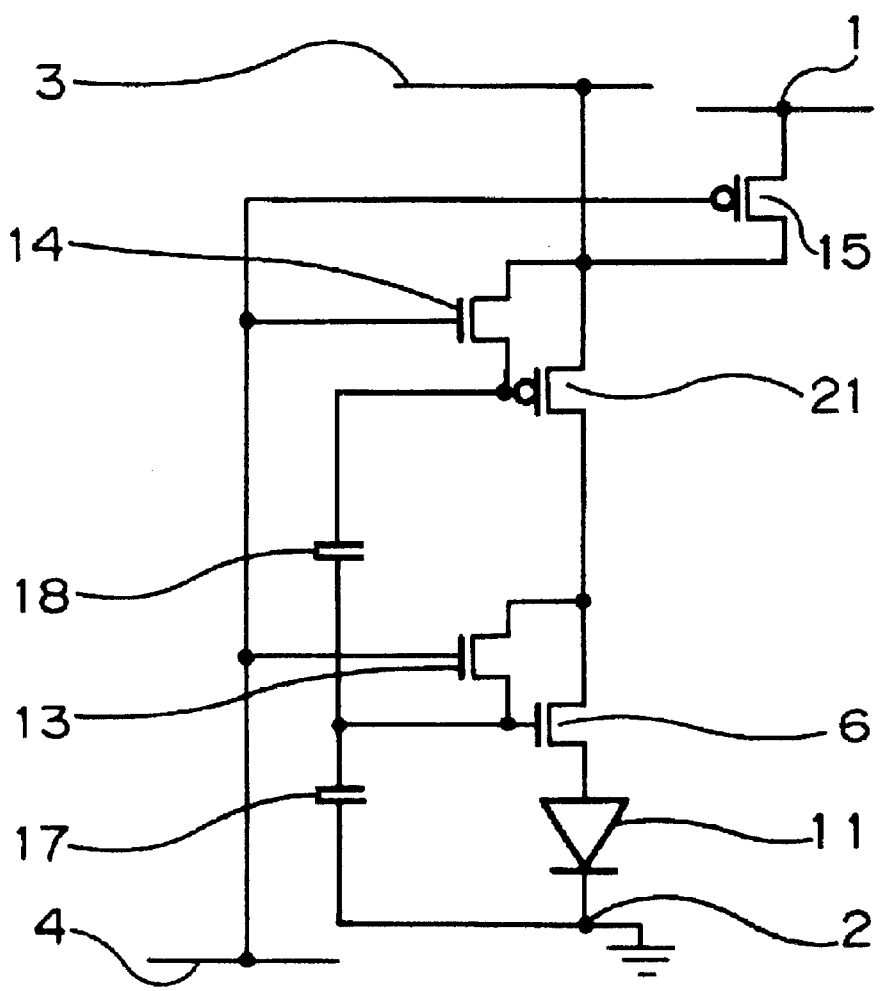
FIG. 8 is a circuit diagram of a current driving circuit in accordance with the seventh embodiment of the present invention.

FIG. 8 is a circuit diagram of a current driving circuit in accordance with the seventh embodiment of the present invention.

The current driving circuit is comprised of a first terminal 1 electrically connected to a voltage source, a second terminal 2 grounded, the first and second terminals 1 and 2 constituting a pair of voltage source electrodes, a signal line 3 through which a signal current runs, a first switch transistor 13, a second switch transistor 14, a third switch transistor 15 electrically connected to the first terminal 1, a fourth transistor 21 which makes a current bypass, a first storage capacity 17, a second storage capacity 18, a driving transistor 6, an organic electroluminescence device 11 acting as a load to the driving transistor 6, and a selection line 4 electrically connected to gates of the first to third switch transistors 13, 14 and 15.

The first storage capacity 17 is electrically connected between a gate of the driving transistor and the second terminal 2.

The first switch transistor 13 is electrically connected between a drain and a gate of the driving transistor 6. Specifically, the first switch transistor 13 has a drain electrically connected to a connection point through which a drain of the driving transistor 6 and a source of the fourth transistor 21 are electrically connected to each other, a source electrically connected to a gate of the driving transistor 6, and a gate electrically connected to the selection line 4.

The second switch transistor 14 is electrically connected between a drain and a gate of the fourth transistor 21. Specifically, the second switch transistor 14 has a drain electrically connected to a connection point through which a drain of the fourth transistor 21 and a drain of the third transistor 15 are electrically connected to each other, a source electrically connected to a connection point through which a gate of the fourth transistor 21 and the second storage capacity 18 are electrically connected to each other, and a gate electrically connected to the selection line 4.

The second storage capacity 18 is electrically connected between a gate of the fourth transistor 21 and a gate of the driving transistor 6.

The third switch transistor 15 has a source electrically connected to the first terminal, a drain electrically connected to a connection point through which a drain of the second transistor 14, a drain of the fourth transistor 21, and a drain of the driving transistor 6 are electrically connected to one another, and a gate electrically connected to the selection line 4.

In the current driving circuit in accordance with the present embodiment, the first switch transistor 13, the second switch transistor 14 and the fourth transistor 21 have the same polarity as a polarity of the driving transistor 6, and the third switch transistor 15 has a polarity opposite to a polarity of the driving transistor 6.

The current driving circuit in accordance with the seventh embodiment operates as follows.

When the selection line 4 is in a low level, the first and second switch transistors 13 and 14 are both turned on, and the third switch transistor 15 is turned off.

Since the second switch transistor 14 is turned on, a signal current is supplied to both the first and second storage capacities 17 and 18 from the signal line 3 through the second switch transistor 14. The first storage capacity 17 converts the received signal current into a signal voltage.

In addition, since the first and second switch transistors 13 and 14 are both turned on, the fourth transistor 21 and the driving transistor 6 both act as a diode, resulting in that the signal current is supplied to the organic electroluminescence device 11 through the fourth transistor 21 and the driving transistor 6.

Furthermore, since the first switch transistor 13 is turned on, a drain voltage is almost equal to a gate voltage in the driving transistor 6. In other words, a difference in voltage between a drain and a source of the driving transistor 6 is equal to a difference in voltage between a gate and a source in the driving transistor 6.

A voltage between a gate and a source of the fourth transistor 21 is applied across the second storage capacity 18.

When the selection line 4 is in a low level, the first and second switch transistors 13 and 14 are both turned off, and the third switch transistor 15 is turned on. As a result, the driving transistor 6 and the fourth transistor 21 transfer to a mode where they act as a transistor, from a mode where they act as a diode in which a drain and a gate are short-circuited with each other.

A voltage defined by electric charges stored in both the first and second storage capacities 17 and 18 is applied to a gate of the fourth transistor 21, and the signal voltage defined by the signal current supplied from the signal line 3 is applied to a gate of the driving transistor 6. Hence, the driving transistor 6 supplies a voltage equal to the signal voltage, to the organic electroluminescence device 11 from the first terminal 1 through the third switch transistor 15 and the fourth transistor 21.

At this stage, a voltage between a gate and a source of the fourth transistor 21 is applied across the second storage capacity 18, and a drain voltage is equal to a gate voltage in the driving transistor 6. That is, a difference in voltage between a drain and a source is equal to a difference in voltage between a gate and a source in the driving transistor 6.

Accordingly, regardless of whether the selection line 4 is in a high or low level, a voltage between a drain and a gate in the driving transistor 6 remains unchanged, resulting in that the influence caused by the Early voltage can be eliminated.

This means that, when the current driving circuit in accordance with the present embodiment is used for an image display device, the organic electroluminescence device 11 can receive a current without fluctuation regardless of whether the selection line 4 is in a high or low level, ensuring that an image display device without non-uniformity in gradation can be presented.

This advantage can be obtained also by applying the current driving circuit in accordance with the above-mentioned first to sixth embodiments to an image display device.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-313581 filed on Oct. 13, 2000 including specification, claims, drawings and summary is incorporated herein by reference in its entirety.

What is claimed is:

1. A current driving circuit comprising:
   (a) a first terminal electrically connected to a voltage source;
   (b) a second terminal grounded;
   (c) a signal line through which a signal current runs;
   (d) a first switch;

(e) a second switch electrically connected to said signal line and further electrically connected in series to said first switch;
(f) a third switch electrically connected to said first terminal;
(g) a memory stage which converts said signal current into a voltage and stores said voltage therein;
(h) a driving transistor;
(i) a load electrically connected between a source of said driving transistor and said second terminal; and
(j) a selection line electrically connected to said first switch, said second switch and said third switch, wherein said signal line is electrically connected to a gate of said driving transistor through said first and second switches, said memory stage is electrically connected between a gate of said driving transistor and said second terminal, said first switch is electrically connected between a drain and a gate of said driving transistor, and said driving transistor has a drain which is electrically connected to said signal line through said second switch and further to said first terminal through said third switch.

2. The current driving circuit as set forth in claim 1, wherein said first and second switches are turned on and said third switch is turned off when said selection line is in one of high and low levels, and said first and second switches are turned off and said third switch is turned on when said selection line is in the other level.

3. The current driving circuit as set forth in claim 1, wherein said load is comprised of an organic electroluminescence device.

4. A current driving circuit comprising:
(a) a first terminal electrically connected to a voltage source;
(b) a second terminal grounded;
(c) a signal line through which a signal current runs;
(d) a first switch transistor;
(e) a second switch transistor;
(f) a third switch transistor;
(g) a storage capacity which converts said signal current into a voltage and stores said voltage therein;
(h) a driving transistor;
(i) a load electrically connected between a source of said driving transistor and said second terminal; and
(j) a selection line electrically connected to gates of said first to third switch transistors, wherein said storage capacity is electrically connected between a gate of said driving transistor and said second terminal, said first and second switch transistors are electrically connected in series to each other between said signal line and said driving transistor, a connection point through which said first and second switch transistors are electrically connected to each other is electrically connected to a drain of said driving transistor, and said driving transistor has a drain electrically connected to said first terminal through said third switch transistor.

5. The current driving circuit as set forth in claim 4, wherein said first and second switch transistors have the same polarity as a polarity of said driving transistor.

6. The current driving circuit as set forth in claim 4, wherein said third switch transistor has a polarity opposite to a polarity of said driving transistor, said first switch transistor and said second switch transistor.

7. The current driving circuit as set forth in claim 4, wherein said first and second switch transistors have a polarity opposite to a polarity of said driving transistor.

8. The current driving circuit as set forth in claim 4, wherein said third switch transistor has a polarity which is identical with a polarity of said driving transistor, and is opposite to a polarity of said first and second switch transistors.

9. The current driving circuit as set forth in claim 4, wherein said load is comprised of an organic electroluminescence device.

10. A current driving circuit comprising:
(a) a first terminal electrically connected to a voltage source;
(b) a second terminal grounded;
(c) a signal line through which a signal current runs;
(d) a first switch transistor;
(e) a second switch transistor;
(f) a third switch transistor;
(g) a storage capacity which converts said signal current into a voltage and stores said voltage therein;
(h) a driving transistor;
(i) a load electrically connected between a source of said driving transistor and said second terminal; and
(j) a selection line electrically connected to gates of said first to third switch transistors, wherein said storage capacity is electrically connected between a gate of said driving transistor and said second terminal, said second switch transistor has a source electrically connected to a connection point through which a drain of said driving transistor and a drain of said third switch transistor are electrically connected to each other, said first and second switch transistors have drains electrically connected to said signal line, said first switch transistor has a source electrically connected to a connection point through which a gate of said driving transistor and said storage capacity are electrically connected to each other, and said driving transistor has a drain electrically connected to said first terminal through said third switch transistor.

11. The current driving circuit as set forth in claim 10, wherein said first and second switch transistors have the same polarity as a polarity of said driving transistor.

12. The current driving circuit as set forth in claim 10, wherein said third switch transistor has a polarity opposite to a polarity of said driving transistor, said first switch transistor and said second switch transistor.

13. The current driving circuit as set forth in claim 10, wherein said load is comprised of an organic electroluminescence device.

14. A current driving circuit comprising:
(a) a first terminal electrically connected to a voltage source;
(b) a second terminal grounded;
(c) a signal line through which a signal current runs;
(d) a first switch transistor;
(e) a second switch transistor;
(f) a third switch transistor;
(g) a fourth transistor;
(h) a storage capacity which converts said signal current into a voltage and stores said voltage therein;

(i) a driving transistor;
(j) a load electrically connected between a source of said driving transistor and said second terminal; and
(k) a selection line electrically connected to gates of said first to third switch transistors, wherein said storage capacity is electrically connected between a gate of said driving transistor and said second terminal, said second switch transistor has a source electrically connected to a connection point through which a drain of said driving transistor and a drain of said third switch transistor are electrically connected to each other, said second switch transistor has a drain electrically connected to said signal line, said fourth transistor is electrically connected between a drain of said first switch transistor and a drain of said second switch transistor, said fourth transistor has the same polarity as a polarity of said first and second switch transistors, said fourth transistor has a drain and a gate both of which are electrically connected to a connection point through which said second switch transistor and said signal line are electrically connected to each other, and a source electrically connected to a drain of said first switch transistor, said first switch transistor has a source electrically connected to a connection point through which a gate of said driving transistor and said storage capacity are electrically connected to each other, and said driving transistor has a drain electrically connected to said first terminal through said third switch transistor.

15. The current driving circuit as set forth in claim 14, wherein said first and second switch transistors have the same polarity as a polarity of said driving transistor.

16. The current driving circuit as set forth in claim 14, wherein said third switch transistor has a polarity opposite to a polarity of said driving transistor, said first switch transistor and said second switch transistor.

17. The current driving circuit as set forth in claim 14, wherein said fourth transistor has the same polarity as a polarity of said driving transistor, said first switch transistor and said second switch transistor.

18. The current driving circuit as set forth in claim 14, wherein said load is comprised of an organic electroluminescence device.

19. A current driving circuit comprising:
(a) a first terminal electrically connected to a voltage source;
(b) a second terminal grounded;
(c) a signal line through which a signal current runs;
(d) a first switch transistor;
(e) a second switch transistor;
(f) a third switch transistor;
(g) a fourth transistor;
(h) a storage capacity which converts said signal current into a voltage and stores said voltage therein;
(i) a driving transistor;
(j) a load electrically connected between a source of said driving transistor and said second terminal; and
(k) a selection line electrically connected to gates of said first to third switch transistors, wherein said storage capacity is electrically connected between a gate of said driving transistor and said second terminal, said second switch transistor has a source electrically connected to a connection point through which a drain of said driving transistor and a drain of said third switch transistor are electrically connected to each other, said first and second switch transistors have drains electrically connected to said signal line, said fourth transistor has a source electrically connected to a connection point through which said storage capacity and a gate of said driving transistor are electrically connected to each other, and a drain electrically connected to said signal line, said first switch transistor has a source electrically connected to a gate of said fourth transistor, and said driving transistor has a drain electrically connected to said first terminal through said third switch transistor.

20. The current driving circuit as set forth in claim 19, wherein said first and second switch transistors have the same polarity as a polarity of said driving transistor.

21. The current driving circuit as set forth in claim 19, wherein said third switch transistor has a polarity opposite to a polarity of said driving transistor, said first switch transistor and said second switch transistor.

22. The current driving circuit as set forth in claim 19, wherein said fourth transistor has the same polarity as a polarity of said driving transistor, said first switch transistor and said second switch transistor.

23. The current driving circuit as set forth in claim 19, wherein said load is comprised of an organic electroluminescence device.

24. A current driving circuit comprising:
(a) a first terminal electrically connected to a voltage source;
(b) a second terminal grounded;
(c) a signal line through which a signal current runs;
(d) a first switch transistor;
(e) a second switch transistor;
(f) a third switch transistor;
(g) a fourth transistor;
(h) a first storage capacity which converts said signal current into a voltage and stores said voltage therein;
(i) a first storage capacity which converts said signal current into a voltage and stores said voltage therein;
(j) a driving transistor;
(k) a load electrically connected between a source of said driving transistor and said second terminal; and
(l) a selection line electrically connected to gates of said first to third switch transistors, wherein said first storage capacity is electrically connected between a gate of said driving transistor and said second terminal, said first switch transistor is electrically connected between a drain and a gate of said driving transistor, said fourth transistor has a drain electrically connected to said signal line and a source electrically connected to a drain of said driving transistor, said second switch transistor is electrically connected between a drain and a gate of said fourth transistor, said second storage capacity is electrically connected between a gate of said fourth transistor and a gate of said driving transistor, and said driving transistor has a drain electrically connected to said first terminal through both said third switch transistor and said fourth transistor.

25. The current driving circuit as set forth in claim 24, wherein said first and second switch transistors have the same polarity as a polarity of said driving transistor.

26. The current driving circuit as set forth in claim 24, wherein said fourth transistor has the same polarity as a polarity of said driving transistor.

27. The current driving circuit as set forth in claim 24, wherein said third switch transistor has a polarity opposite to a polarity of said driving transistor.

28. The current driving circuit as set forth in claim 24, wherein said load is comprised of an organic electroluminescence device.

29. An image display device including a current driving circuit which is comprised of:
  (a) a first terminal electrically connected to a voltage source;
  (b) a second terminal grounded;
  (c) a signal line through which a signal current runs;
  (d) a first switch;
  (e) a second switch electrically connected to said signal line and further electrically connected in series to said first switch;
  (f) a third switch electrically connected to said first terminal;
  (g) a memory stage which converts said signal current into a voltage and stores said voltage therein;
  (h) a driving transistor;
  (i) a load electrically connected between a source of said driving transistor and said second terminal; and
  (j) a selection line electrically connected to said first switch, said second switch and said third switch,
wherein said signal line is electrically connected to a gate of said driving transistor through said first and second switches,
  said memory stage is electrically connected between a gate of said driving transistor and said second terminal,
  said first switch is electrically connected between a drain and a gate of said driving transistor, and
  said driving transistor has a drain which is electrically connected to said signal line through said second switch and further to said first terminal through said third switch.

30. An image display device including a current driving circuit which is comprised of:
  (a) a first terminal electrically connected to a voltage source;
  (b) a second terminal grounded;
  (c) a signal line through which a signal current runs;
  (d) a first switch transistor;
  (e) a second switch transistor;
  (f) a third switch transistor;
  (g) a storage capacity which converts said signal current into a voltage and stores said voltage therein;
  (h) a driving transistor;
  (i) a load electrically connected between a source of said driving transistor and said second terminal; and
  (j) a selection line electrically connected to gates of said first to third switch transistors,
wherein said storage capacity is electrically connected between a gate of said driving transistor and said second terminal,
  said first and second switch transistors are electrically connected in series to each other between said signal line and said driving transistor,
  a connection point through which said first and second switch transistors are electrically connected to each other is electrically connected to a drain of said driving transistor, and
  said driving transistor has a drain electrically connected to said first terminal through said third switch transistor.

31. An image display device including a current driving circuit which is comprised of:
  (a) a first terminal electrically connected to a voltage source;
  (b) a second terminal grounded;
  (c) a signal line through which a signal current runs;
  (d) a first switch transistor;
  (e) a second switch transistor;
  (f) a third switch transistor;
  (g) a storage capacity which converts said signal current into a voltage and stores said voltage therein;
  (h) a driving transistor;
  (i) a load electrically connected between a source of said driving transistor and said second terminal; and
  (j) a selection line electrically connected to gates of said first to third switch transistors,
wherein said storage capacity is electrically connected between a gate of said driving transistor and said second terminal,
  said second switch transistor has a source electrically connected to a connection point through which a drain of said driving transistor and a drain of said third switch transistor are electrically connected to each other,
  said first and second switch transistors have drains electrically connected to said signal line,
  said first switch transistor has a source electrically connected to a connection point through which a gate of said driving transistor and said storage capacity are electrically connected to each other, and
  said driving transistor has a drain electrically connected to said first terminal through said third switch transistor.

32. An image display device including a current driving circuit which is comprised of:
  (a) a first terminal electrically connected to a voltage source;
  (b) a second terminal grounded;
  (c) a signal line through which a signal current runs;
  (d) a first switch transistor;
  (e) a second switch transistor;
  (f) a third switch transistor;
  (g) a fourth transistor;
  (h) a storage capacity which converts said signal current into a voltage and stores said voltage therein;
  (i) a driving transistor;
  (j) a load electrically connected between a source of said driving transistor and said second terminal; and
  (k) a selection line electrically connected to gates of said first to third switch transistors,
wherein said storage capacity is electrically connected between a gate of said driving transistor and said second terminal,
  said second switch transistor has a source electrically connected to a connection point through which a drain of said driving transistor and a drain of said third switch transistor are electrically connected to each other,
  said second switch transistor has a drain electrically connected to said signal line, said fourth transistor is electrically connected between a drain of said first switch transistor and a drain of said second switch transistor, said fourth transistor has the same polarity as a polarity of said first and second switch transistors, said fourth transistor has a drain and a gate both of which are electrically connected to a connection point through which said second switch transistor and said signal line are electrically connected to each other, and a source electrically connected to a drain of said first switch transistor, said first switch transistor has a source electrically connected to a connection point through which a gate of said driving transistor and said storage capacity are electrically connected to each other, and said driving transistor has a drain electrically connected to said first terminal through said third switch transistor.

33. An image display device including a current driving circuit which is comprised of:
   (a) a first terminal electrically connected to a voltage source;
   (b) a second terminal grounded;
   (c) a signal line through which a signal current runs;
   (d) a first switch transistor;
   (e) a second switch transistor;
   (f) a third switch transistor;
   (g) a fourth transistor;
   (h) a storage capacity which converts said signal current into a voltage and stores said voltage therein;
   (i) a driving transistor;
   (j) a load electrically connected between a source of said driving transistor and said second terminal; and
   (k) a selection line electrically connected to gates of said first to third switch transistors, wherein said storage capacity is electrically connected between a gate of said driving transistor and said second terminal, said second switch transistor has a source electrically connected to a connection point through which a drain of said driving transistor and a drain of said third switch transistor are electrically connected to each other, said first and second switch transistors have drains electrically connected to said signal line, said fourth transistor has a source electrically connected to a connection point through which said storage capacity and a gate of said driving transistor are electrically connected to each other, and a drain electrically connected to said signal line, said first switch transistor has a source electrically connected to a gate of said fourth transistor, and said driving transistor has a drain electrically connected to said first terminal through said third switch transistor.

34. An image display device including a current driving circuit which is comprised of:
   (a) a first terminal electrically connected to a voltage source;
   (b) a second terminal grounded;
   (c) a signal line through which a signal current runs;
   (d) a first switch transistor;
   (e) a second switch transistor;
   (f) a third switch transistor;
   (g) a fourth transistor;
   (h) a first storage capacity which converts said signal current into a voltage and stores said voltage therein;
   (i) a first storage capacity which converts said signal current into a voltage and stores said voltage therein;
   (j) a driving transistor;
   (k) a load electrically connected between a source of said driving transistor and said second terminal; and
   (l) a selection line electrically connected to gates of said first to third switch transistors, wherein said first storage capacity is electrically connected between a gate of said driving transistor and said second terminal, said first switch transistor is electrically connected between a drain and a gate of said driving transistor, said fourth transistor has a drain electrically connected to said signal line and a source electrically connected to a drain of said driving transistor, said second switch transistor is electrically connected between a drain and a gate of said fourth transistor, said second storage capacity is electrically connected between a gate of said fourth transistor and a gate of said driving transistor, and said driving transistor has a drain electrically connected to said first terminal through both said third switch transistor and said fourth transistor.

* * * * *